(12) United States Patent
Yebka et al.

(10) Patent No.: US 9,450,440 B2
(45) Date of Patent: Sep. 20, 2016

(54) HIGH CAPACITY BATTERIES WITH ON-DEMAND FAST CHARGE CAPABILITY

(71) Applicant: Lenovo (Singapore) Pte. Ltd., Singapore (SG)

(72) Inventors: Bouziane Yebka, Apex, NC (US);
Tin-Lup Wong, Chapel Hill, NC (US);
Philip John Jakes, Durham, NC (US);
Joseph Anthony Holung, Wake Forest, NC (US)

(73) Assignee: Lenovo (Singapore) Pte. Ltd., Singapore (SG)

( * ) Notice: Subject to any disclaimer, the term of this patent is extended or adjusted under 35 U.S.C. 154(b) by 310 days.

(21) Appl. No.: 14/089,885

(22) Filed: Nov. 26, 2013

(65) Prior Publication Data
US 2015/0145480 A1    May 28, 2015

(51) Int. Cl.
*H02J 7/00*    (2006.01)

(52) U.S. Cl.
CPC .............. *H02J 7/007* (2013.01); *H02J 7/0047* (2013.01)

(58) Field of Classification Search
USPC ........................................................ 320/112
See application file for complete search history.

(56) References Cited

U.S. PATENT DOCUMENTS

| | | | |
|---|---|---|---|
| 2008/0048614 A1* | 2/2008 | Partin | H02J 7/0073 320/116 |
| 2009/0291330 A1* | 11/2009 | Onnerud | H01M 2/0275 429/7 |
| 2010/0289457 A1* | 11/2010 | Onnerud | H02J 7/0093 320/162 |
| 2013/0221928 A1* | 8/2013 | Kelty | B60L 11/187 320/134 |
| 2013/0271076 A1* | 10/2013 | Gregg | B60L 11/1838 320/109 |

OTHER PUBLICATIONS

"Fast and Ultra-fast Chargers", Battery University, available at: http://batteryuniversity.com/learnlarticle/ultra_fast_chargers, last accessed Nov. 25, 2013, 3 pages.

\* cited by examiner

*Primary Examiner* — Mohammed Alam
(74) *Attorney, Agent, or Firm* — Ference & Associates LLC

(57) ABSTRACT

An embodiment provides an apparatus, including: apparatus components; a battery pack comprising a high charge rate cell component, the battery pack supplying power to one or more of the apparatus components; a processor; and a memory device accessible to the processor and storing code executable by the processor to: apply a normal rate of charge to a cell component of the battery pack; accept user input to switch the normal rate of charge to a second rate of charge which is higher than the normal rate of charge; and apply the second rate of charge to the high charge rate cell component based on the user input. Other aspects are described and claimed.

18 Claims, 6 Drawing Sheets

HIGH CAPACITY BATTERIES WITH ON-DEMAND FAST CHARGE CAPABILITY

BACKGROUND

The popular functionalities of many electronic devices, e.g., information handling devices such as laptop computers, smart phones, tablets, e-readers, etc., as well as other electronic devices, e.g., power tools, automobiles, etc., are dependent at least in part on battery power. As such, batteries are continually refined and improved in an effort to meet customer expectations with respect to powering of such devices or sub-components thereof.

The development of batteries in this respect has largely focused on developing batteries having longer runtimes (e.g., via selection of battery chemistries for high capacity/energy density) and longer life spans (e.g., via implementation of partial charging schemes). For example, in the context of information handling devices such as laptop computers, smart phones, tablet devices, etc., low and normal rate cells, i.e., those that are charged slowly over an extended period of time, are often selected for use. Low or normal rate include technology that gives high energy density/capacity, long discharge times/running times, and feature a long lifespan (e.g., 1000 plus charge/discharge cycles). The cells of these low or normal charge rate batteries are generally charged slowly, e.g., a rate not exceeding 1C, where 1C=a charge or discharge rate equal to capacity of the battery in one hour. For example, typically a reduced charge rate (e.g., a rate of less than 1C) is supplied and the battery therefore takes more than one hour to charge "fully", with the understanding that some batteries are not fully charged but are rather fractionally charged and nonetheless considered fully charged. These normal charge rate batteries may be fast charged, e.g., using a high rate of charge exceeding 1C; however, they do not retain as much capacity when such high rate charging is applied.

High charge rate cells have also been developed that charge/discharge quickly (i.e., as compared to low and normal charge rate cells). These high charge rate cells are charged at higher rates, e.g., exceeding 1C, and thus can be fully charged and fully discharged in less than one hour. However, these high rate cells suffer in that they typically have reduced runtimes and moreover have limited a limited lifespan (e.g., less than 500 charge/discharge cycles). Accordingly, such high charge rate cells are often not implemented.

BRIEF SUMMARY

In summary, one aspect provides an apparatus, comprising: apparatus components; a battery pack comprising a high charge rate cell component, the battery pack supplying power to one or more of the apparatus components; a processor; and a memory device accessible to the processor and storing code executable by the processor to: apply a normal rate of charge to a cell component of the battery pack; accept user input to switch the normal rate of charge to a second rate of charge which is higher than the normal rate of charge; and apply the second rate of charge to the high charge rate cell component based on the user input.

Another aspect provides a battery pack, comprising: a high charge rate cell component; a processor; and a memory device accessible to the processor and storing code executable by the processor to: apply a normal rate of charge to a cell component of the battery pack; accept user input to switch the normal rate of charge to a second rate of charge which is higher than the normal rate of charge; and apply the second rate of charge to the high charge rate cell component based on the user input.

A further aspect provides a method, comprising: displaying, on a display device of an apparatus, a graphical user interface, the graphical user interface having a switch interface therein for switching between a normal rate of charge and a higher rate of charge for charging a battery pack of the apparatus; receiving, at the apparatus, user input to the graphical user interface selecting a switching option of the switch interface; switching the charging of the battery pack from the normal rate of charge to the higher rate of charge, the battery pack including at least one high charge rate cell component; and applying the higher rate of charge to the at least one high charge rate cell component of the battery pack based on the user input.

The foregoing is a summary and thus may contain simplifications, generalizations, and omissions of detail; consequently, those skilled in the art will appreciate that the summary is illustrative only and is not intended to be in any way limiting.

For a better understanding of the embodiments, together with other and further features and advantages thereof, reference is made to the following description, taken in conjunction with the accompanying drawings. The scope of the invention will be pointed out in the appended claims.

DETAILED DESCRIPTION

Figure 1:
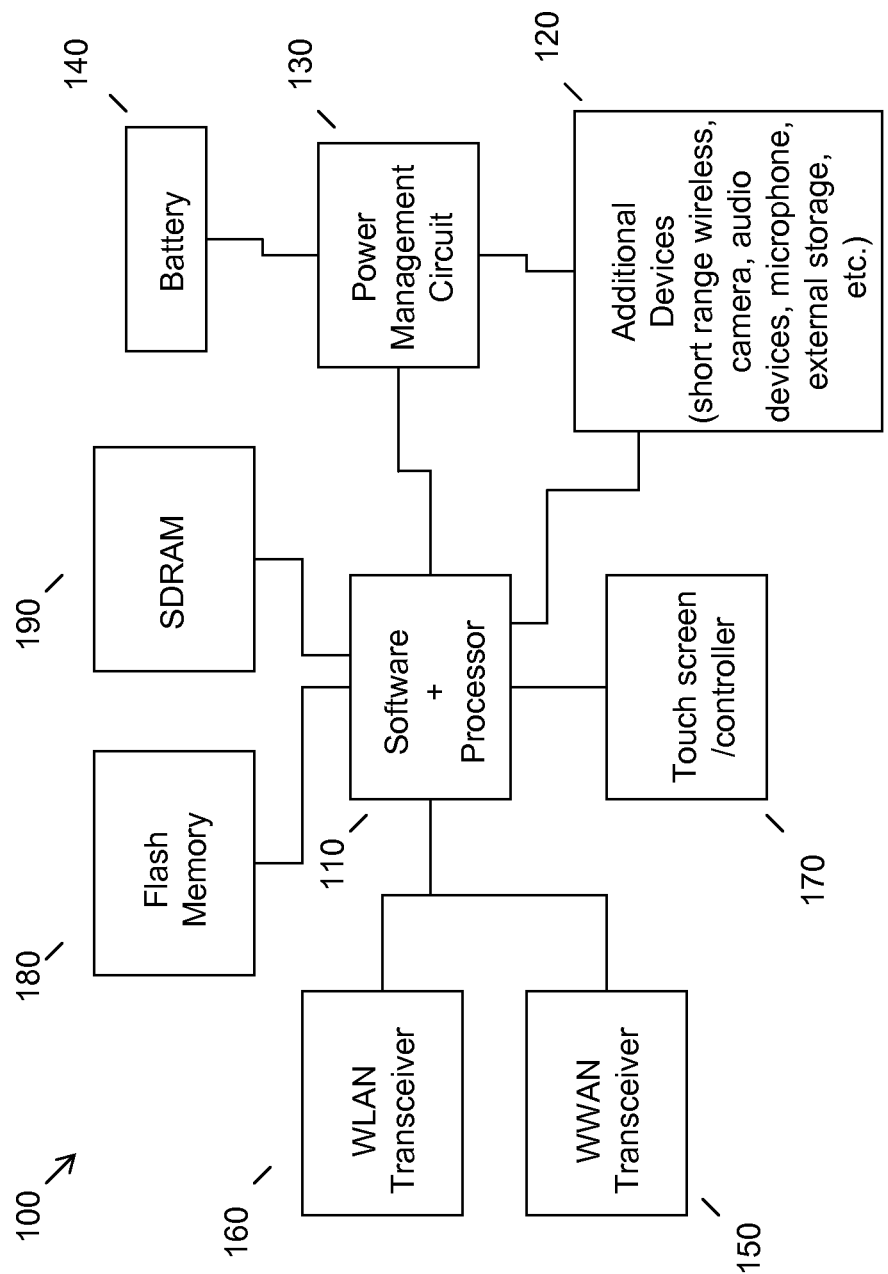
FIG. 1 illustrates an example of information handling device circuitry.

It will be readily understood that the components of the embodiments, as generally described and illustrated in the figures herein, may be arranged and designed in a wide variety of different configurations in addition to the described example embodiments. Thus, the following more detailed description of the example embodiments, as represented in the figures, is not intended to limit the scope of the embodiments, as claimed, but is merely representative of example embodiments.

Reference throughout this specification to "one embodiment" or "an embodiment" (or the like) means that a particular feature, structure, or characteristic described in connection with the embodiment is included in at least one embodiment. Thus, the appearance of the phrases "in one embodiment" or "in an embodiment" or the like in various places throughout this specification are not necessarily all referring to the same embodiment.

Furthermore, the described features, structures, or characteristics may be combined in any suitable manner in one or more embodiments. In the following description, numerous specific details are provided to give a thorough understanding of embodiments. One skilled in the relevant art will recognize, however, that the various embodiments can be practiced without one or more of the specific details, or with other methods, components, materials, et cetera. In other instances, well known structures, materials, or operations are not shown or described in detail to avoid obfuscation.

While low or normal charge rate cells and battery packs are capable of extended lifespan (charge/discharge cycles) and runtimes (due to high energy density), these cells take a long time to charge (e.g., in excess of 1 hour). If a higher rate of charge is applied, the capacity of these normal or low charge rate cells suffers. In contrast, high energy density cells that are capable of accepting a high rate of charge tend to also discharge quickly (have reduced runtimes), and moreover have a limited lifespan in comparison to low or normal rate charge cells. Neither of these cell types is acceptable for certain customers, e.g., those customers that would like quick charging, long runtime, and are willing to sacrifice lifespan (e.g., customers that never intend to keep their electronic devices for extended periods of time (e.g., on the order of years).

Accordingly, an embodiment provides a battery pack that is capable of accepting a high rate of charge, providing a long runtime (on the order of high density normal rate charge cells, i.e., contain a high density high rate charge cell component), and elongating the lifespan of the battery pack. In one embodiment, a user may change the rate of charge over the lifetime of the battery pack to suit particular needs. For example, a user may switch the rate of charge and therefore sacrifice lifespan in favor of quicker charging time. In an embodiment, feedback is provided for the user such that the user is apprised of the impact (e.g., on lifespan) of the decision to increase the rate of charge.

The illustrated example embodiments will be best understood by reference to the figures. The following description is intended only by way of example, and simply illustrates certain example embodiments.

While various other circuits, circuitry or components may be utilized in electronic devices, for information handling devices, such as a smart phone and/or tablet circuitry 100, an example illustrated in FIG. 1 includes a system on a chip design found for example in tablet or other mobile computing platforms. Software and processor(s) are combined in a single chip 110. Processors comprise internal arithmetic units, registers, cache memory, busses, I/O ports, etc., as is well known in the art. Internal busses and the like depend on different vendors, but essentially all the peripheral devices (120) may attach to a single chip 110. The circuitry 100 combines the processor, memory control, and I/O controller hub all into a single chip 110. Also, systems 100 of this type do not typically use SATA or PCI or LPC. Common interfaces, for example, include SDIO and I2C.

There are power management chip(s) 130, e.g., a battery management unit, BMU, which manage power as supplied, for example, via a rechargeable battery 140 (also referred to herein as a battery pack), which may be recharged by a connection to a power source (not shown). In at least one design, a single chip, such as 110, is used to supply BIOS like functionality and DRAM memory.

System 100 typically includes one or more of a WWAN transceiver 150 and a WLAN transceiver 160 for connecting to various networks, such as telecommunications networks and wireless Internet devices, e.g., access points. Additional devices 120 may be included. Commonly, system 100 will include a touch screen 170 for data input and display/rendering. System 100 also typically includes various memory devices, for example flash memory 180 and SDRAM 190.

Figure 2:
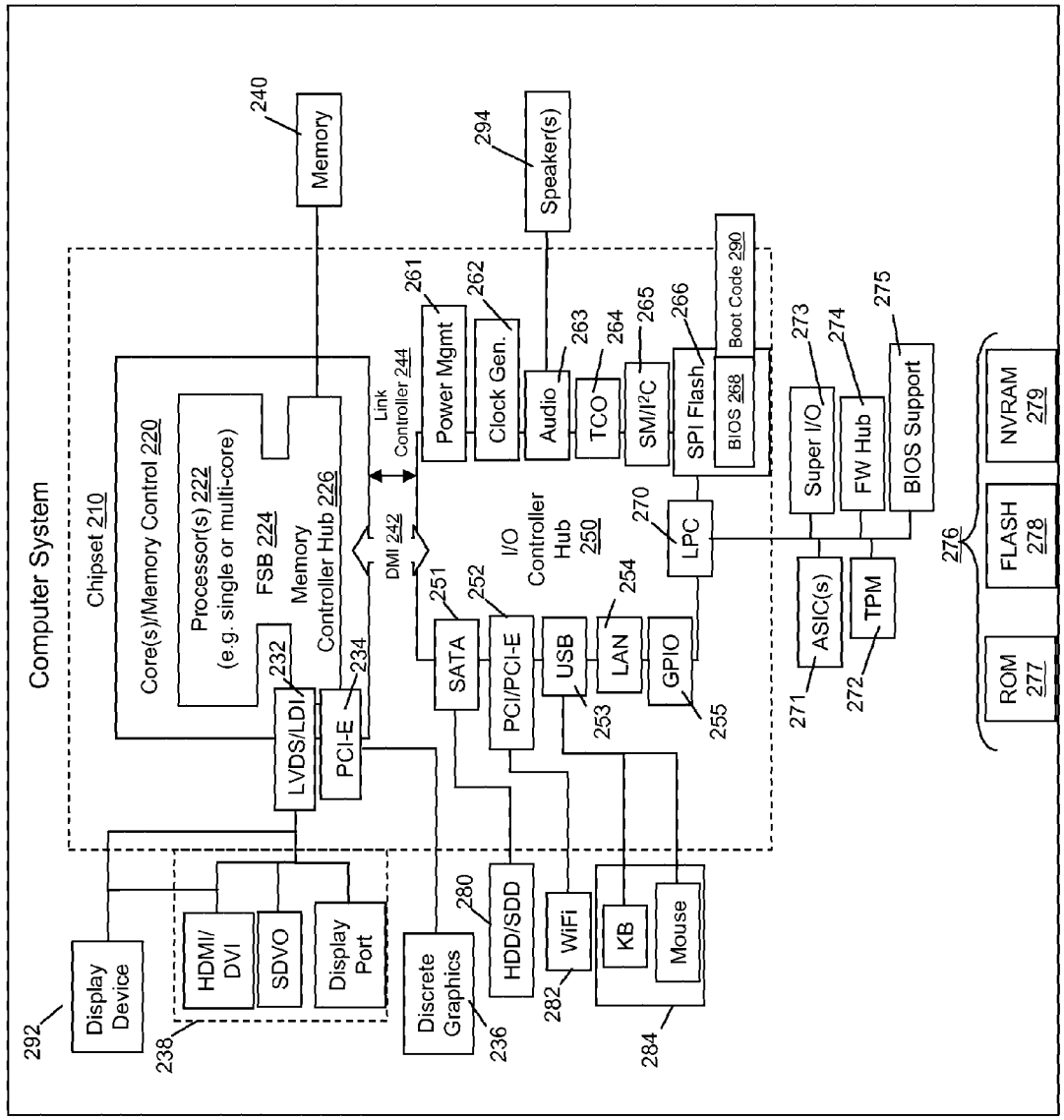
FIG. 2 illustrates another example of an information handling device.

FIG. 2 depicts a block diagram of another example of information handling device circuits, circuitry or components. The example depicted in FIG. 2 may correspond to computing systems such as the THINKPAD series of personal computers sold by Lenovo (US) Inc. of Morrisville, N.C., or other devices. As is apparent from the description herein, embodiments may include other features or only some of the features of the example illustrated in FIG. 2.

The example of FIG. 2 includes a so-called chipset 210 (a group of integrated circuits, or chips, that work together, chipsets) with an architecture that may vary depending on manufacturer (for example, INTEL, AMD, ARM, etc.). INTEL is a registered trademark of Intel Corporation in the United States and other countries. AMD is a registered trademark of Advanced Micro Devices, Inc. in the United States and other countries. ARM is an unregistered trademark of ARM Holdings plc in the United States and other countries. The architecture of the chipset 210 includes a core and memory control group 220 and an I/O controller hub 250 that exchanges information (for example, data, signals, commands, etc.) via a direct management interface (DMI) 242 or a link controller 244. In FIG. 2, the DMI 242 is a chip-to-chip interface (sometimes referred to as being a link between a "northbridge" and a "southbridge"). The core and memory control group 220 include one or more processors 222 (for example, single or multi-core) and a memory controller hub 226 that exchange information via a front side bus (FSB) 224; noting that components of the group 220 may be integrated in a chip that supplants the conventional "northbridge" style architecture. One or more processors 222 comprise internal arithmetic units, registers, cache memory, busses, I/O ports, etc., as is well known in the art.

In FIG. 2, the memory controller hub 226 interfaces with memory 240 (for example, to provide support for a type of RAM that may be referred to as "system memory" or "memory"). The memory controller hub 226 further includes a LVDS interface 232 for a display device 292 (for example, a CRT, a flat panel, touch screen, etc.). A block 238 includes some technologies that may be supported via the LVDS interface 232 (for example, serial digital video, HDMI/DVI, display port). The memory controller hub 226 also includes a PCI-express interface (PCI-E) 234 that may support discrete graphics 236.

In FIG. 2, the I/O hub controller 250 includes a SATA interface 251 (for example, for HDDs, SDDs, etc., 280), a PCI-E interface 252 (for example, for wireless connections 282), a USB interface 253 (for example, for devices 284 such as a digitizer, keyboard, mice, cameras, phones, microphones, storage, other connected devices, etc.), a network interface 254 (for example, LAN), a GPIO interface 255, a LPC interface 270 (for ASICs 271, a TPM 272, a super I/O 273, a firmware hub 274, BIOS support 275 as well as various types of memory 276 such as ROM 277, Flash 278, and NVRAM 279), a power management interface 261, a clock generator interface 262, an audio interface 263 (for example, for speakers 294), a TCO interface 264, a system management bus interface 265, and SPI Flash 266, which can include BIOS 268 and boot code 290. The I/O hub controller 250 may include gigabit Ethernet support.

The system, upon power on, may be configured to execute boot code 290 for the BIOS 268, as stored within the SPI Flash 266, and thereafter processes data under the control of one or more operating systems and application software (for example, stored in system memory 240). An operating system may be stored in any of a variety of locations and accessed, for example, according to instructions of the BIOS 268. As described herein, a device may include fewer or more features than shown in the system of FIG. 2.

Electronic device circuitry, as for example outlined in FIG. 1 or FIG. 2, may be used in devices that implement a battery or battery pack according to the various embodiments described herein. For example, a battery 140 of FIG. 1 may include functionality, e.g., rate of charging, that is modified via logic included in device component(s), e.g., power management circuit 130, power management interface 261, and/or in logic included in a battery pack itself, e.g., battery 140. In this regard, the battery pack may include one or more processors, memory and code or instructions and/or circuitry for implementing functionality, e.g., controlling the charging of the cells, providing power to other device components, safety features, etc.

Figure 3:
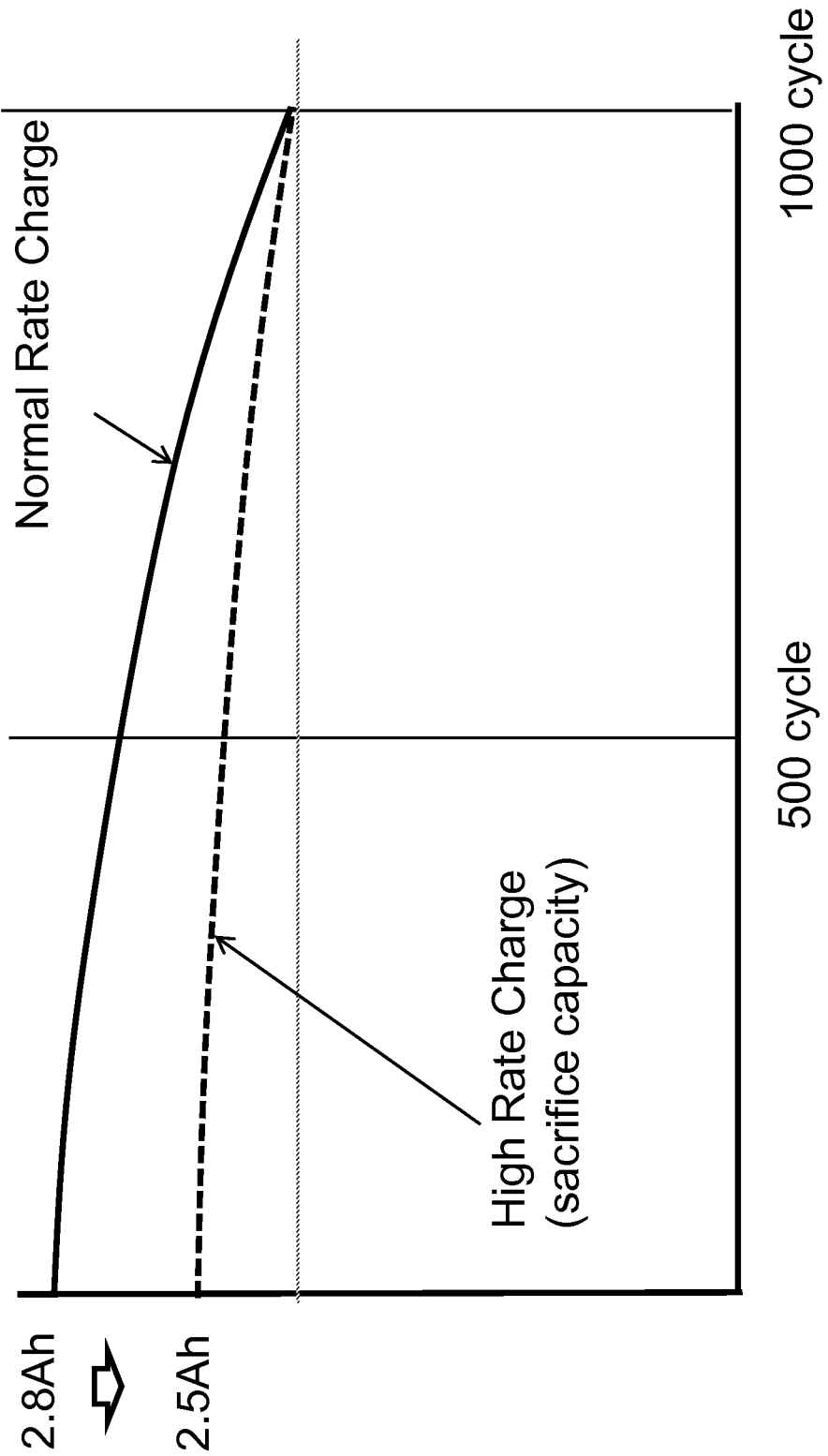
FIG. 3 illustrates an example of the effect of rate of charge on capacity (Ah) and lifespan (cycles) of a normal or low charge rate cell.

FIG. 3 outlines the effect that the rate of charge has on a normal charge rate cell, e.g., a nickel, cobalt aluminum containing cell with a chemistry chosen for slow or normal charging, e.g., not exceeding 1C rate of charge/discharge. As outlined in FIG. 3, such normal charge rate cells will accept a high rate charge, e.g., exceeding 1C, but suffer in as much as they lose capacity, negatively impacting runtime. In the example of FIG. 3, the normal charge rate cell's capacity, if a normal rate charge is applied, will be a capacity of 2.8 Ah. In contrast, if the same normal charge rate cell has a high rate charge supplied, e.g., exceeding 1C, it will only have a capacity of 2.5 Ah, negatively impacting/reducing the runtime. Nonetheless, such high rate charges may be supplied and not reduce the lifespan (number of charge/discharge cycles in the useful life of the battery pack). As illustrated in FIG. 3, the normal charge rate cell will, if the high rate charge is repeatedly supplied, maintain a lifespan of 1000 plus charge/discharge cycles.

Figure 4:
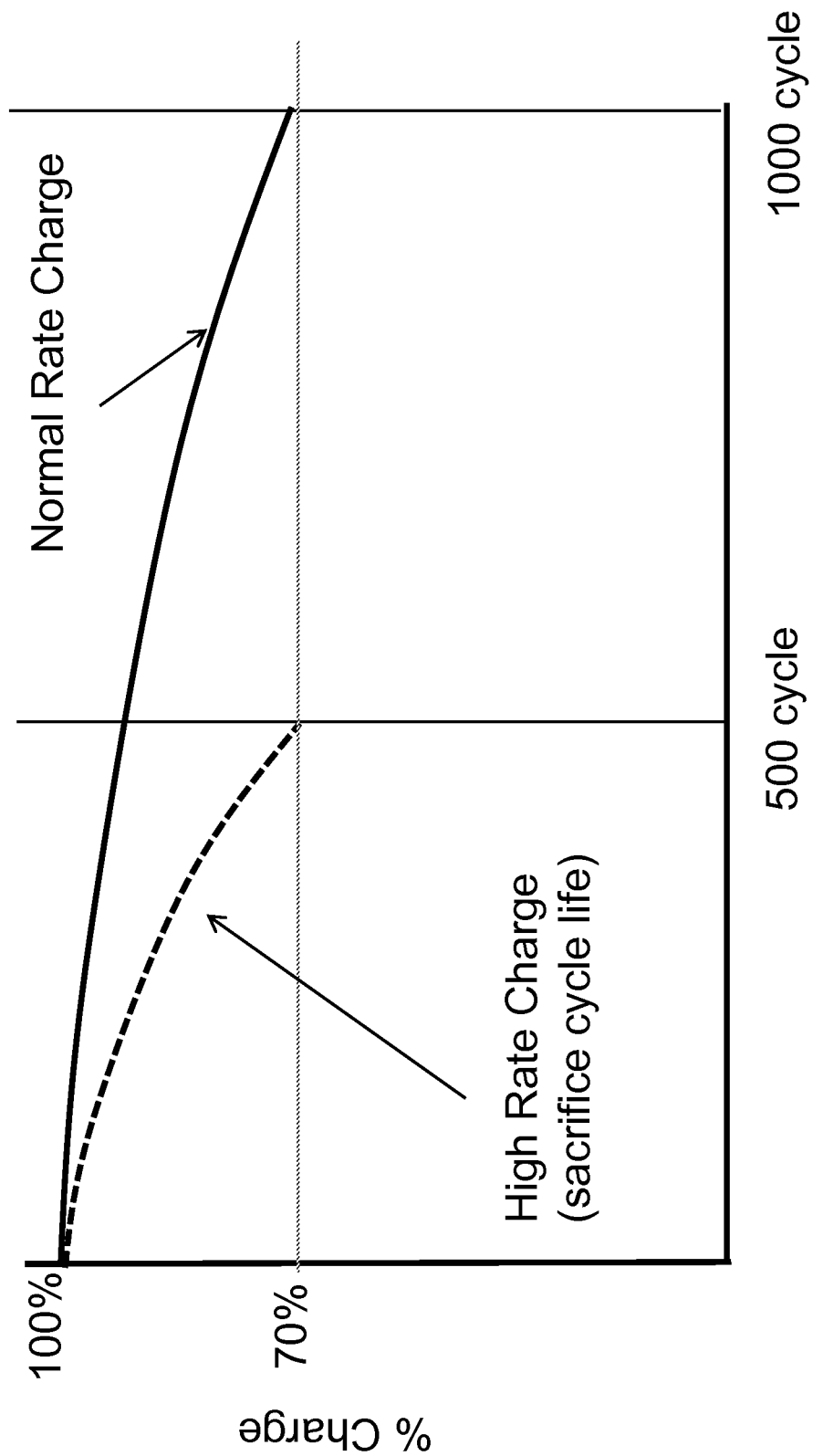
FIG. 4 illustrates an example of the effect of rate of charge on capacity (% charge) and lifespan (cycles) for a high charge rate cell.

Such a normal charge rate cell is contrasted by a high charge rate cell, as illustrated in FIG. 4. Here it may be appreciated that the high charge rate cell, while maintaining the same capacity if either the high rate charge or the normal rate charge is supplied, nonetheless has the negative characteristic of losing lifespan if the high rate charge (e.g., exceeding 1C) is supplied. Thus, repeatedly applying such a high rate of charge, while advantageously reducing the charging time without sacrificing capacity produced by the charging, will unfortunately reduce the lifespan significantly, e.g., to approximately 500 charge/discharge cycles. Table 1 includes a summary comparison between normal charge rate cells and high charge rate cells.

TABLE 1

Example High and Normal Charge Rate Cell Comparison (cylindrical cells): Low Energy Density is <2.0 Ah, High Energy Density is >2.8 Ah, Low Charge/Discharge Rate is <1 C, High Charge/Discharge Rate is >1 C, High Lifespan is retaining ≥70% capacity for 750 charge/discharge cycles, Reduced lifespan is retaining ≤70% capacity for 500 charge/discharge cycles.

|  | High Charge Rate Cells | Normal Charge Rate Cells |
|---|---|---|
| Energy Density/Capacity | Low | High |
| Charge Rate | High | Low |
| Discharge Rate | High | Low |
| Cycle Lifespan | Reduced | High |

Figure 5:
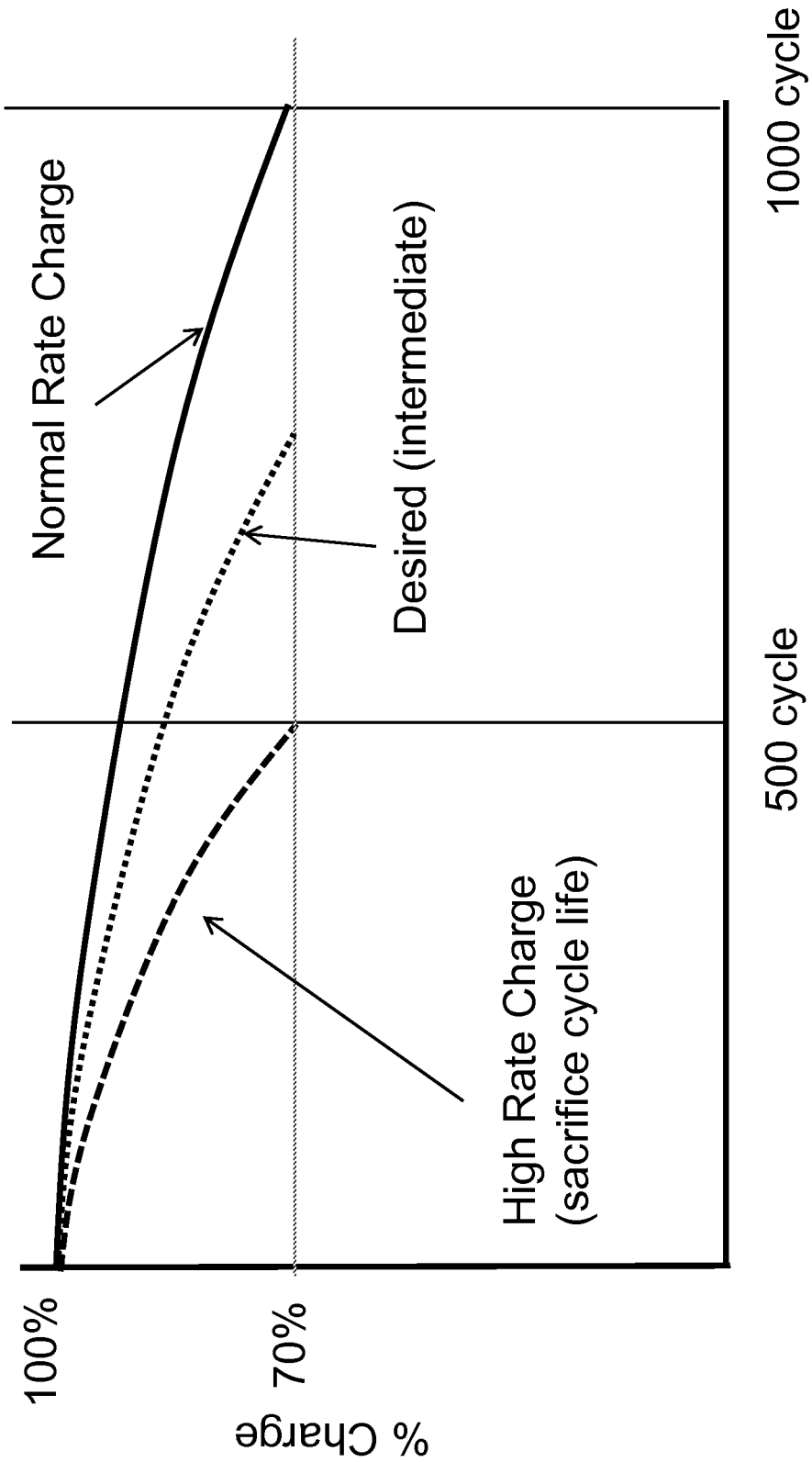
FIG. 5 illustrates an example of the effect of varying rate of charge for a high charge rate cell.

Certain customers desire a compromise between these two alternatives, as illustrated in FIG. 5. Here, it can be appreciated that if a high density cell (similar to FIG. 4) is chosen, but the rate of charge supplied is varied over time, a compromise is established. Thus, a desired intermediate amount of lifespan, e.g., between 500 and 1000 charge/discharge cycles, may be maintained while still utilizing a high rate charge for intermittent quick charging. Moreover, depending on the chemistry selected, the capacity of the cell will not suffer as a consequence of selecting the high rate charge chemistry, which in turn leads to long runtimes approximating those of a normal charge rate cell.

Thus, an embodiment provides a battery pack capable of maintaining this compromise. An embodiment provides a user with a choice between high charge rate and normal charge rate such that quick charging using a high charge rate may be selected, but nonetheless the user may retain an acceptable lifespan for the battery pack by switching back to normal charge rate as appropriate. Therefore, an embodiment empowers the user to make choices regarding trading lifespan for reduced charging times.

In an embodiment, a battery pack includes both a high charge rate cell component and a normal charge rate cell component. The high charge rate cell component is for example a cell that includes a high density, high charge rate cell chemistry capable of quick charging but, if repeatedly charged this way, will suffer from reduced lifespan. The normal charge rate cell component is for example a cell that includes a high density, normal charge rate cell chemistry capable of slowly charging to a high capacity, capable of maintaining a lifespan if charged at high or normal rates, but has reduced capacity if charged at a high rate. Examples of normal rate charge and high rate charge cell chemistries are provided in Table 2.

TABLE 2

Example Cell Chemistries. N is Nickel, A is Aluminum, C is Cobalt, M is Manganese, Combine is mixed in-cell, Hybrid is separate cells in the same battery pack, High Energy Density/Capacity is >2 Ah, Reduced Energy Density/Capacity is <2 Ah, High Lifespan is retaining ≥70% capacity for 750 charge/discharge cycles, Reduced lifespan is retaining ≤70% capacity for 500 charge/discharge cycles.

| High Rate Charge | Normal Rate Charge | Pack Configuration | Energy Density/ Capacity | Lifespan |
|---|---|---|---|---|
| NCA | NCA | Combine | High | Reduced |
| M spinel | M spinel | Combine | High | Reduced |
| Phosphate | C, NCA, NMC, M | Hybrid | Reduced | High |
| M spinel | C | Hybrid | High | Reduced |
| M spinel | NCA | Hybrid | High | Reduced |
| M spinel | NMC | Hybrid | High | Reduced |
| NCA | C | Hybrid | High | Reduced |
| NCA | NMC | Hybrid | High | Reduced |
| NCA | M spinel | Hybrid | High | Reduced |

Accordingly, an embodiment provides a battery pack having both high charge rate cell components and low charge rate cell components. These different cell components may be provided in separate cells (hybrid in Table 2) and/or mixed together within a cell (combined in Table 2). By providing two cell component types in a battery pack, an embodiment permits a user to select which type of charging rate is desired, e.g., high rate charging or low rate charging. Thus, a user is able to decide for himself or herself what is most appropriate given the particular needs.

Figure 6:
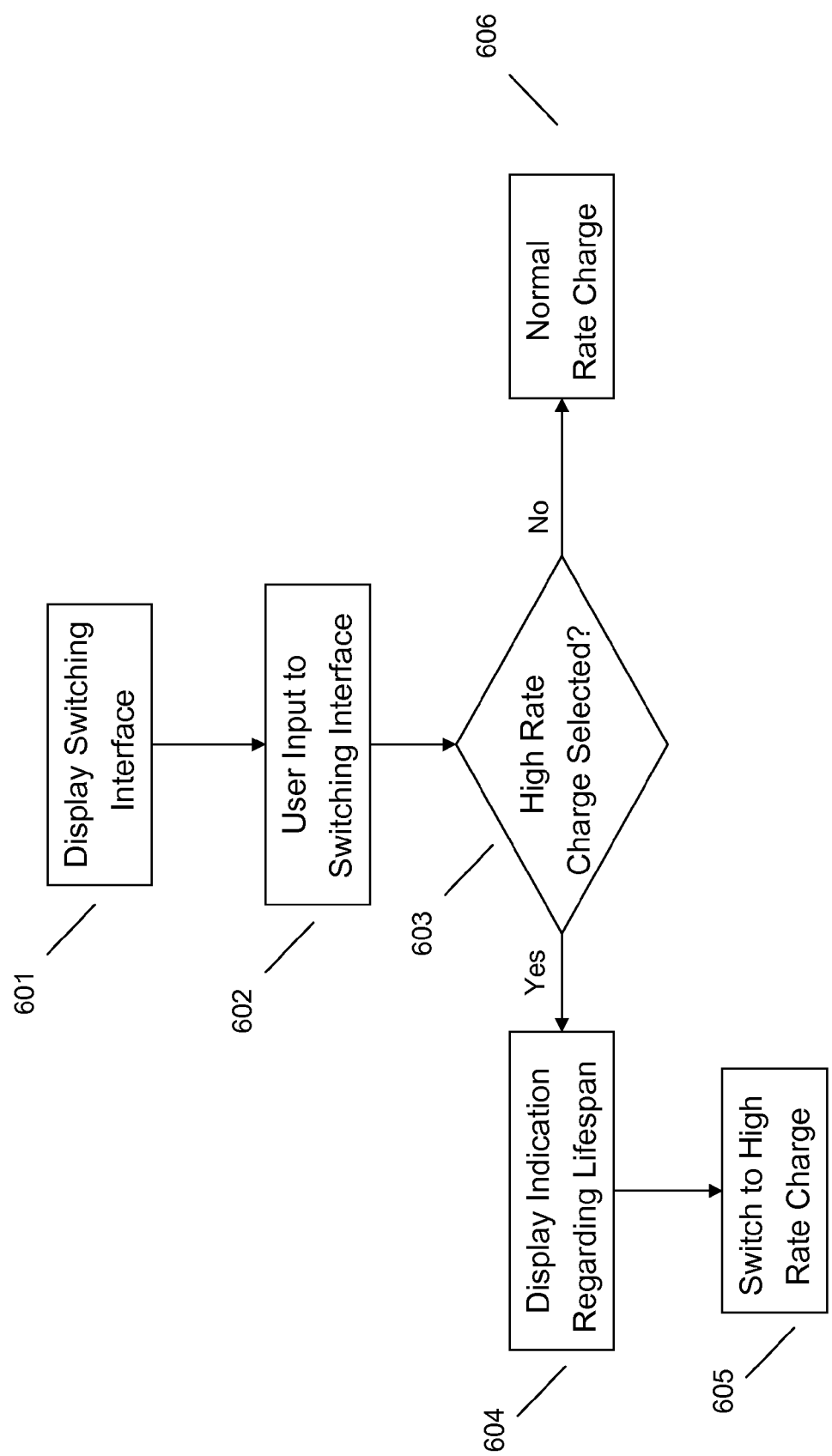
FIG. 6 illustrates an example method of varying rate of charge for a battery pack.

Referring to FIG. 6, an example method for varying or changing the charging rate between normal (e.g., less than 1C or taking more than 1 hour to charge the battery) and high (e.g., exceeding 1C or taking less than 1 hour to charge the battery). In an embodiment, a switch is provided. The switch is configured to switch the charging mode between normal charging rate and high charging rate. The switch may be mechanical, e.g., button or toggle control, or may be a soft switch, for example as included in a graphical user interface that is displayed to a user at 601.

The user, e.g., inputting switching input to the switching interface displayed, may switch between charging modes at 602. Thus, an embodiment may ascertain that a user has provided the switching input via the switching interface and distinguish between a selection of high rate charge and normal rate charge. If it is determined at 603 that the user has provided a switching input to switch the charging mode to a high rate of charging at 603, an embodiment may switch the charging mode to supply a high rate charge to the battery pack at 605.

Optionally, if a user has switched to the high rate charge mode (as ascertained at 603), an embodiment may provide an indication to the user, e.g., via display of an indication on a display device of the electronic device. This indication may take a variety of forms and may be presented at a variety of times. In the example illustrated in FIG. 6, the indication is displayed at 604, e.g., after the user has chosen to switch to a high rate charging mode but prior to implementing the switching. This may be appropriate, for example, for providing in the indication an estimate of the effect or impact, e.g., on battery pack lifespan, of switching to the high rate charge mode. Thus, a user may be apprised generally that the switch to the high rate charge mode provides for faster charging but negatively impacts the lifespan of the battery pack. Additionally or in the alternative, the indication may provide a specific estimate of the switching impact on lifespan, e.g., reduces lifespan by a particular percentage (such as estimated for a particular cell and/or battery pack chemistry). Moreover, the estimate may be cumulative, e.g., calculated with specific knowledge of how many times the particular battery pack has been subjected to the high rate charging and/or other parameters. Thus, the user may be apprised of the impact on lifespan for choosing the charging mode.

The estimate may contain other information, additional information, and/or may be presented at additional or alternative times. For example, the estimate may contain other information, e.g., an estimate of extending lifespan for the battery pack, and may be presented at another time, e.g., as the user switches from the high rate charging mode to a normal rate charging mode.

An embodiment therefore gives the user control over which rate of charging is to be implemented for the battery pack, as described herein. By including at least one high charge rate cell component in the battery pack, the battery pack may be charged to a high capacity quickly by the user. By including at least one normal charge rate cell component in the battery pack, the battery pack may be charged slowly to a high capacity and retain a long lifespan. By virtue of including both components, along with the ability to switch charging modes, an embodiment allows the user to select for themselves which type of charging is most appropriate. Therefore, an embodiment permits users to have the battery pack charged to a high capacity quickly and/or slowly, with the resulting impact on lifespan in the user's control.

As will be appreciated by one skilled in the art, various aspects may be embodied as a system, method or device program product. Accordingly, aspects may take the form of an entirely hardware embodiment or an embodiment including software that may all generally be referred to herein as a "circuit," "module" or "system." Furthermore, aspects may take the form of a device program product embodied in one or more device readable medium(s) having device readable program code embodied therewith.

Any combination of one or more non-signal device readable storage medium(s) may be utilized. A storage medium may be, for example, an electronic, magnetic, optical, electromagnetic, infrared, or semiconductor system, apparatus, or device, or any suitable combination of the foregoing. More specific examples of a storage medium would include the following: a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a storage medium is not a signal and "non-transitory" includes all media except signal media.

Program code embodied on a storage medium may be transmitted using any appropriate medium, including but not limited to wireless, wireline, optical fiber cable, RF, et cetera, or any suitable combination of the foregoing.

Program code for carrying out operations may be written in any combination of one or more programming languages. The program code may execute entirely on a single device, partly on a single device, as a stand-alone software package, partly on single device and partly on another device, or entirely on the other device. In some cases, the devices may be connected through any type of connection or network, including a local area network (LAN) or a wide area network (WAN), or the connection may be made through other devices (for example, through the Internet using an Internet Service Provider), through wireless connections, e.g., near-field communication, or through a hard wire connection, such as over a USB connection.

Example embodiments are described herein with reference to the figures, which illustrate example methods, devices and program products according to various example embodiments. It will be understood that the actions and functionality may be implemented at least in part by program instructions. These program instructions may be provided to a processor of a general purpose information handling device, a special purpose information handling device, or other programmable data processing device to produce a machine, such that the instructions, which execute via a processor of the device implement the functions/acts specified.

It is worth noting that while specific blocks are used in the figures, and a particular ordering of blocks has been illustrated, these are non-limiting examples. In certain contexts, two or more blocks may be combined, a block may be split into two or more blocks, or certain blocks may be re-ordered or re-organized as appropriate, as the explicit illustrated examples are used only for descriptive purposes and are not to be construed as limiting.

As used herein, the singular "a" and "an" may be construed as including the plural "one or more" unless clearly indicated otherwise.

This disclosure has been presented for purposes of illustration and description but is not intended to be exhaustive or limiting. Many modifications and variations will be apparent to those of ordinary skill in the art. The example embodiments were chosen and described in order to explain principles and practical application, and to enable others of ordinary skill in the art to understand the disclosure for various embodiments with various modifications as are suited to the particular use contemplated.

Thus, although illustrative example embodiments have been described herein with reference to the accompanying figures, it is to be understood that this description is not limiting and that various other changes and modifications may be affected therein by one skilled in the art without departing from the scope or spirit of the disclosure.

What is claimed is:

1. An apparatus, comprising:
   apparatus components;
   a battery pack comprising a high charge rate cell component having a charge/discharge rate of greater than 1C and a normal charge rate cell component having a charge/discharge rate of less than 1C, the battery pack supplying power to one or more of the apparatus components;
   a processor; and
   a memory device accessible to the processor and storing code executable by the processor to:
   apply a normal rate of charge to a cell component of the battery pack;
   accept user input to switch the normal rate of charge to a second rate of charge which is higher than the normal rate of charge; and
   apply the second rate of charge to the high charge rate cell component based on the user input.

2. The apparatus of claim 1, wherein the apparatus includes a switching component that accepts the user input switching between the normal rate of charge and the high rate of charge.

3. The apparatus of claim 2, wherein the switching component is selected from the group of switching components consisting of a graphical user interface having a switch interface therein and a mechanical switching component.

4. The apparatus of claim 1, further comprising a display device;
   wherein the code is further executable by the processor to display an indication on the display device regarding switching to the high rate of charge.

5. The apparatus of claim 4, wherein the indication comprises an estimate of an impact of choosing the high rate of charge on lifespan of the battery pack.

6. The apparatus of claim 5, wherein the estimate is a cumulative estimate.

7. The apparatus of claim 1, wherein a cell component of the battery pack is selected from the group of high charge rate cell components consisting of a mixture of nickel, cobalt and aluminum; and manganese spinel.

8. The apparatus of claim 1, wherein the normal charge rate component and the high charge rate component are both disposed within a cell of the battery pack.

9. The apparatus of claim 1, wherein the normal charge rate component and the high charge rate component are disposed in separate cells of the battery pack.

10. The apparatus of claim 1, wherein the apparatus is a device selected from the group of devices consisting of an information handling device, a power tool, and an automobile.

11. A battery pack, comprising:
    a high charge rate cell component having a charge/discharge rate of greater than 1C;
    a normal charge rate cell component having a charge/discharge rate of less than 1C;
    a processor; and
    a memory device accessible to the processor and storing code executable by the processor to:
    apply a normal rate of charge to a cell component of the battery pack;
    accept user input to switch the normal rate of charge to a second rate of charge which is higher than the normal rate of charge; and
    apply the second rate of charge to the high charge rate cell component based on the user input.

12. The battery pack of claim 11, wherein the battery pack includes a cell component selected from the group of high charge rate cell components consisting of a mixture of nickel, cobalt and aluminum; and manganese spinel.

13. The battery pack of claim 11, wherein the normal charge rate component and the high charge rate component are both disposed within a cell of the battery pack.

14. The apparatus of claim 11, wherein the normal charge rate component and the high charge rate component are disposed in separate cells of the battery pack.

15. A method, comprising:
    displaying, on a display device of an apparatus, a graphical user interface, the graphical user interface having a switch interface therein for switching between a normal rate of charge and a higher rate of charge for charging a battery pack of the apparatus;
    receiving, at the apparatus, user input to the graphical user interface selecting a switching option of the switch interface;
    switching the charging of the battery pack from the normal rate of charge to the higher rate of charge, the battery pack including at least one high charge rate cell component having a charge/discharge rate of greater than 1C; and
    applying the higher rate of charge to the at least one high charge rate cell component of the battery pack based on the user input;
    wherein said battery pack comprises a normal charge rate cell component having a charge/discharge rate of less than 1C.

16. The method of claim 15, further comprising displaying an indication on the display device regarding switching to the higher rate of charge.

17. The method of claim 16, wherein the indication comprises an estimate of an impact of choosing the higher rate of charge on lifespan of the battery pack.

18. The method of claim 17, wherein the estimate is a cumulative estimate.

* * * * *